(12) United States Patent
Alharith

(10) Patent No.: US 10,718,184 B1
(45) Date of Patent: Jul. 21, 2020

(54) THERMOCHEMICAL METHOD FOR REMOVING ORGANIC AND INORGANIC DEPOSITS FROM A WELLBORE

(71) Applicant: Saudi Arabian Oil Company, Dhahran (SA)

(72) Inventor: Abdullah M. Alharith, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/570,167

(22) Filed: Sep. 13, 2019

(51) Int. Cl.
*E21B 37/06* (2006.01)
*C09K 8/528* (2006.01)

(52) U.S. Cl.
CPC .............. *E21B 37/06* (2013.01); *C09K 8/528* (2013.01)

(58) Field of Classification Search
CPC .............................. E21B 37/06; C09K 18/528
See application file for complete search history.

(56) References Cited

U.S. PATENT DOCUMENTS

| | | | |
|---|---|---|---|
| 4,583,784 A * | 4/1986 | Uhri | E21F 15/00 299/11 |
| H1126 H | 1/1993 | Pan et al. | |
| 5,891,262 A | 4/1999 | Khalil et al. | |
| 7,906,462 B2 | 3/2011 | Mesher et al. | |
| 9,701,894 B2 * | 7/2017 | Al-Nakhli | C09K 8/90 |
| 9,738,824 B2 * | 8/2017 | Al-Nakhli | E21B 43/26 |
| 10,151,186 B2 * | 12/2018 | Al-Nakhli | C09K 8/536 |
| 2011/0114323 A1 | 5/2011 | Jennings et al. | |
| 2018/0274348 A1 | 9/2018 | Karale et al. | |

OTHER PUBLICATIONS

Amin et al. "Production Profile of Wells Before and After Treatment Using Novel Thermochemical Technique" SPE International, SPE 107663, 2007, 9 pgs.
Brasted "Reaction of Sodium Nitrite and Sulfamic Acid, Indirect Gravimetric Determination of Nitrites" School of chemistry, University of Minnesota, Minneapolis, Minn. 1952, 4 pgs.
Brown et al. "A Novel Exothermic Process for the Removal of Paraffin Deposits in Hydrocarbon Production" Corrosion 98, 1998, 7 pgs.
Ibrahim "Thermochemical Solution for Removal of Organic Solids Deposit in and Around Wellbore and Production Tubing" SPE International, SPE 93844, 2005, 10 pgs.
U.S. Statutory Invention Registration No. H11126, published Jan. 5, 1983, Pan et al.

* cited by examiner

*Primary Examiner* — Silvana C Runyan
(74) *Attorney, Agent, or Firm* — Dinsmore & Shohl LLP

(57) ABSTRACT

A method for removing wellbore deposits includes the steps of providing a first treatment solution comprising a nitrite salt and a second treatment solution comprising sulfamic acid into the wellbore, allowing the first and second treatment solutions to mix and form a cleaning fluid, and maintaining the first and second treatment solutions in reactive connection. The first and second treatment solutions are maintained in reactive connection to initiate reaction of the sulfamic acid and the nitrite salt to generate an acidic bisulfate salt, heat, and nitrogen gas; remove organic and inorganic deposits from the wellbore; and stimulate the walls of the wellbore by dissolving minerals in the walls of the wellbore with the generated acidic bisulfate salt. Organic and inorganic deposits are removed from the wellbore by liquefying the organic deposits upon elevation of the temperature with the generated heat and breaking down the inorganic deposits with the acidic bisulfate salt.

16 Claims, 3 Drawing Sheets

THERMOCHEMICAL METHOD FOR REMOVING ORGANIC AND INORGANIC DEPOSITS FROM A WELLBORE

TECHNICAL FIELD

Embodiments of the present specification generally relate to removing organic and inorganic deposits from the wellbore of oil wells in combination with stimulating production of hydrocarbons from the surrounding formation.

BACKGROUND

A problem in oil well extraction is the formation of organic and inorganic deposits within the wellbore. Interaction between different materials including oil, water, rock, drilling components, and production chemical under downhole conditions creates a variety of deposits within the wellbore. Organic deposits in the form of waxes and asphaltenes commonly are one type of deposit commonly encountered during extraction operations. Similarly, inorganic deposits, such as scale, commonly form on well components during extraction operations. Mineral deposits (scaling) occur because of the produced water, which accompanies oil production, or may occur when the formation water mixes with different brines such as injection water causing a reaction between incompatible ions and formation of scale on downhole surfaces. Types of inorganic scales known to the oil and gas industry include carbonates, sulfates, sulfides, and chlorites.

The presence of organic and inorganic deposits with a wellbore and on production equipment may be detrimental to production efficiency and yield. Specifically, deposition of inorganic and organic matter may cause blockage or restriction of flow through well-bore perforations, casings, pipelines, pumps, valves, and other exposed production equipment.

Previous attempts at mitigating and removing deposits from a wellbore have been limited to removing organic deposits or inorganic deposits, but not a combination of both organic and inorganic deposits.

SUMMARY

Accordingly, additional needs exist for the ability to effectively remove both organic and inorganic deposits from production wellbores with a single treatment. This unmet need is met with the presently disclosed methods of removing wellbore deposits with a thermochemical reaction while concurrently stimulating the walls of the wellbore.

According to one embodiment, a method for removing wellbore deposits is provided. The method includes providing a first treatment solution comprising a nitrite salt into a wellbore, providing a second treatment solution comprising sulfamic acid into the wellbore, allowing the first treatment solution and the second treatment solution to mix and form a cleaning fluid, and maintaining the first treatment solution and the second treatment solution in reactive connection. The first treatment solution and the second treatment solution are maintained in reactive connection to initiate reaction of the sulfamic acid and the nitrite salt to generate an acidic bisulfate salt, heat, and nitrogen gas, remove organic and inorganic deposits from the wellbore, and stimulate the walls of the wellbore by dissolving minerals in the walls of the wellbore with the generated acidic bisulfate salt. The organic and inorganic deposits are removed by liquefying the organic deposits within the wellbore upon elevation of the temperature of the organic deposits with the generated heat and breaking down the inorganic deposits with the generated acidic bisulfate salt.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

DETAILED DESCRIPTION

Figure 1:
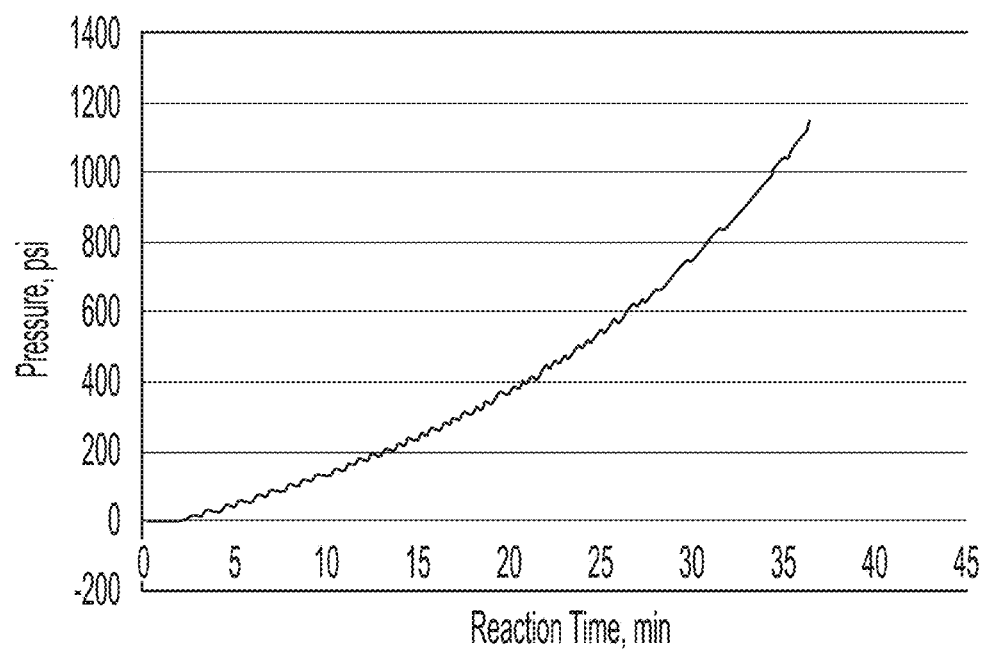
FIG. 1 is a graph of pressure increase in a closed vessel during a reaction in accordance with embodiments of the present disclosure.

Reference will now be made in detail to embodiments of a method for removing wellbore deposits.

As used throughout this disclosure, the term "wellbore" refers to the drilled hole or borehole, including the open hole or uncased portion of the well. Borehole may refer to the inside diameter of the wellbore wall or the rock face that bounds the drilled hole.

As used throughout this disclosure, the term "production tubing" refers to a wellbore tubular used to produce reservoir fluids. Production tubing is assembled with other completion components to make up the production string. The production tubing selected for any completion should be compatible with the wellbore geometry, reservoir production characteristics and the reservoir fluids.

As used throughout this disclosure, the term "coiled tubing" refers to a continuous length of pipe wound on a spool. The pipe is straightened prior to pushing into a wellbore and rewound to coil the pipe back onto the transport and storage spool. It will be appreciated that coiled tubing may be 5,000 meters (m) or greater in length. Coiled tubing may be provided as a secondary and separated conduit through the wellbore and may be passed within the annulus of the production tubing.

As used throughout this disclosure, the term "formation matrix" refers to the finer grained, interstitial particles that lie between larger particles or in which larger particles are embedded in sedimentary rocks such as sandstones.

As used throughout this disclosure, the term "acid stimulation" refers to the treatment of a subterranean formation with a cleaning fluid containing a reactive acid. In sandstone formations, the acid reacts with the soluble substances in the formation matrix to enlarge the pore spaces. In carbonate formations, the acid dissolves the entire formation matrix. In each case, the stimulation improves the formation permeability to enable enhanced production of reservoir fluids.

As used throughout this disclosure, the term "sandstone" refers to any formation primarily composed of silica, silicate minerals and various forms of feldspar and clays. The grains of sandstone rock are traditionally sand-sized. The term is commonly used to imply consolidated sand or a rock made of predominantly quartz sand, although sandstones often contain feldspar, rock fragments, mica and numerous additional mineral grains held together with silica or another type of cement. The porosity and permeability of sandstones are noted as being potentially hydrocarbon-bearing reservoir rocks.

As used throughout this disclosure, the term "carbonate" refers to a class of sedimentary rock which comprises 95 percent (%) or more by weight calcite ($CaCO_3$), aragonite (also $CaCO_3$), and dolomite ($CaMg(CO_3)_2$). Dolomite is a mineral that can replace calcite during the process of dolomitization. Limestone, dolostone or dolomite, and chalk are carbonate rocks. Carbonate rocks can serve as hydrocarbon reservoir rocks, particularly if their porosity has been enhanced through dissolution. Carbonate rocks rely on fractures for permeability to allow for flow and extraction of hydrocarbon reservoirs trapped within the reservoir rocks.

As used throughout this disclosure, the term "carbonate scaling" refers to a type of mineral deposit buildup that may be found on the wellbore, tubulars, and other components the well as the saturation of produced water is affected by changing temperature and pressure conditions in the subterranean formation.

Provided in this disclosure are methods for removing wellbore deposits. Removing organic and inorganic deposits may result in increased well productivity by cleansing tubing and the wellbore walls of deposits that block or restrict flow of hydrocarbons. The method of the present disclosure includes providing a first treatment solution comprising a nitrite salt into a wellbore, providing a second treatment solution comprising sulfamic acid ($HOSO_2NH_2$) into a wellbore, allowing the first treatment solution and the second treatment solution to mix and form a cleaning fluid, and maintaining the first treatment solution and the second treatment solution in situ in reactive connection. For purposes of this disclosure the term "reactive connection" means two or more solutions or chemical species are sufficiently mixed and maintained in proximity to each other to allow chemical reactions to occur.

The first treatment solution and the second treatment solution are maintained in reactive connection to initiate reaction of the sulfamic acid and the nitrite salt to generate an acidic bisulfate salt, heat, and nitrogen gas ($N_2$) products; remove organic and inorganic deposits from the wellbore; and stimulate the walls of the wellbore with the generated acidic bisulfate salt. The organic are removed from the wellbore by liquefying the organic deposits within the wellbore upon elevation of the temperature of the organic deposits with the generated heat of the reaction. The inorganic deposits are broken down with the generated acidic bisulfate salt.

The combination of the first treatment solution and the second treatment solution generate a cleaning fluid. The components of the cleaning fluid are provided to the wellbore to generate nitrogen gas, heat, and an acidic bisulfate salt in-situ. An example reaction is provided in Reaction 1 with "X" representing a Group I alkali earth metal.

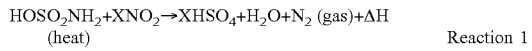
(heat)   Reaction 1

For each of the embodiments described in this disclosure, non-limiting example nitrite salts include sodium nitrite ($NaNO_2$) and potassium nitrite ($KNO_2$). It will be appreciated that when the nitrite salt reacted with the sulfamic acid is sodium nitrite, the generated acidic bisulfate salt is sodium bisulfate ($NaHSO_4$). Similarly, it will be appreciated that when the nitrite salt reacted with the sulfamic acid is potassium nitrite, the generated acidic bisulfate salt is potassium bisulfate ($KHSO_4$).

The method of removing wellbore deposits in accordance with the present disclosure provides a dual-pronged approach with generated heat for removal of organic deposits and the acidic bisulfate salt for removal of inorganic deposits.

In one or more embodiments, organic deposits are removed from the wellbore by elevating the temperature of the organic deposits. Heat is generated in Reaction 1 when sulfamic acid and nitrite salt react to form acidic bisulfate salt, water, and nitrogen. For example, it will be appreciated that the reaction of 1 mole of sodium nitrite and 1 mole of sulfamic acid generates 90.3 kilocalories per mole (Kcal/mol) of heat.

Elevating the temperature of the organic deposits assists in removal of the organic deposits. The temperature increase results in liquefaction of the organic deposits. In various embodiments, the organic deposits in the wellbore are raised to a temperature of at least 66° C., at least 85° C., at least 100° C., or all subranges encompassed by 66° C. to 200° C., such as 66° C. to 102° C.

It will be appreciated that in various embodiments, organic deposits actively removed with application of the disclosed method includes at least one of wax and asphaltene. It will be appreciated that asphaltene melts between approximately 80° C. and 90° C. and wax melts between approximately 40° C. and 60° C. As such, increasing the wellbore temperature to greater than approximately 90° C. is expected to melt organic deposits within the wellbore.

A temperature necessary to liquefy the organic deposits may be achieved by heating the fluids within the wellbore to greater than the melting point of the organic deposits present in the wellbore. In one or more embodiments, maintaining the first treatment solution and the second treatment solution in reactive connection generates a temperature of greater than 120° C. within the wellbore. In various further embodiments, the temperature of the fluids within the wellbore is raised to 120° C. to 300° C. or any subranges encompassed by 120° C. to 300° C., such as 120° C. to 280° C., 120 to 250° C., 120° C. to 200° C., or 150° C. to 200° C. It will be appreciated that the temperature within the wellbore resulting from the heat generated by Reaction 1 is partially dependent on the initial temperature of the formation A greater initial temperature allows for a greater final temperature for the same volume or mass of cleaning fluid.

In one or more embodiments, inorganic deposits are removed from the wellbore with an acidic bisulfate salt. Acidic bisulfate salt is generated in Reaction 1 when sulfamic acid and nitrite salt react. It will be appreciated that in various embodiments, inorganic deposits actively removed with application of the disclosed method include scale formed from one or more of carbonates, such as calcium carbonate. Carbonates may be broken down by an acid to produce carbon dioxide gas. Specifically, the example reaction of sodium bisulfate and calcium carbonate is provided as Reaction 2.

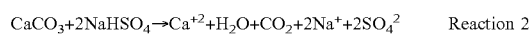
Reaction 2

The reaction of the first treatment solution and the second treatment solution produces an acidic bisulfate salt in accordance with Reaction 1. The acidic bisulfate salt may stimulate the walls of the wellbore by dissolving minerals in the walls of the wellbore in an acid stimulation treatment. The acid stimulation treatment may improve the permeability of the wellbore wall and enable the enhanced production from the wellbore.

In subterranean formations, the acidic bisulfate salt reacts with the minerals in the formation matrix to enlarge the pore spaces. In subterranean formations that comprise carbonate, the minerals dissolved within the subterranean formation may comprise calcite ($CaCO_3$), dolomite ($CaMg(CO_3)_2$), or both $CaCO_3$ and $CaMg(CO_3)_2$.

Upon triggering the exothermic reaction of Reaction 1 downhole, nitrogen gas is generated. Pressure is generated with the generation of nitrogen gas in Reaction 1. Pressure provides energy to flowback the well and flushes the wellbore of the removed organic, inorganic deposits, and minerals.

The nitrogen gas generated from Reaction 1 additionally may increase the pressure within the wellbore. The increased wellbore pressure may act as a propelling force to push the concurrently generated acidic bisulfate salt into the wellbore wall. In one or more embodiments, the targeted zone for stimulation of the wellbore is the skin of the wellbore at a depth of 1 to 3 feet (approximately 30 to 92 centimeters), including all subranges.

The stimulation procedure may result in increased permeability of the wellbore walls. The portions of the wellbore wall thickness treated with the cleaning fluid may have minerals removed as well as any scale build-up reduced as a result of the acidic bisulfate salt exposure. In various, the walls of the wellbore exhibit at least a 40% increase in permeability, at least a 50% increase in permeability, or at least a 60% increase in permeability as compared to the untreated wellbore. The increased permeability allows for passage of hydrocarbons from reservoirs within the formation and increases or revitalizes production of the well.

In one or more embodiments, the components of the cleaning fluid may be provided to the wellbore as two or more separate solutions. Specifically, the first treatment solution comprising a nitrite salt and the second treatment solution comprising sulfamic acid may be provided downhole separately. The first treatment solution and the second treatment solution are combined downhole to initiate Reaction 1 between the nitrite salt and the sulfamic acid. In one or more embodiments, the first treatment solution is provided downhole through a first tubing and the second treatment solution is provided downhole through a second tubing. The first tubing may be a dedicated pipe provided downhole. Similarly, the second tubing may also be dedicated pipe provided downhole separate and independent of the first tubing. In one or more embodiments, the first and second treatment solutions are reversed where the second treatment solution is provided downhole through the first tubing and the first treatment solution is provided downhole through the second tubing.

In one or more embodiments, the components of the treatment solution may be provided to the wellbore simultaneously. Specifically, the first treatment solution comprising a nitrite salt and the second treatment solution comprising sulfamic acid may be provided downhole simultaneously with one of the first and second treatment solutions transported through the first tubing and the other through the second tubing. In various embodiments, the first treatment solution and the second treatment solution may be provided at the same volumetric rate, at the same molar rate, or the same mass rate. In further embodiments, the first treatment solution and the second treatment solution may be provided at different flow rates such that the desired quantities of the first treatment solution and the second treatment solution are fully delivered at approximately the same time. In yet further embodiments, the first treatment solution and the second treatment solution may be provided at different flow rates such that the desired quantities of the first treatment solution and the second treatment solution are fully delivered at disparate times with one component being fully delivered before the other component is fully delivered.

In one or more embodiments, the components of the treatment solution may be provided to the wellbore in a sequential manner. Specifically, the first treatment solution comprising a nitrite salt and the second treatment solution comprising sulfamic acid may be provided downhole sequentially. It will be appreciated that in various embodiments the first treatment solution may be provided downhole first or the second treatment solution may be provided downhole first. The initial treatment solution may be provided in the wellbore and the further treatment solution is provided subsequently with Reaction 1 being initiated upon provision of the later addition. However, it will be appreciated that providing the nitrite salt before the sulfamic acid ensures that the sulfamic acid does not react with components of the well before initiation of Reaction 1 with provision of the nitrite salt. In one or more embodiments where the components of the treatment solution are provided to the wellbore in a sequential manner, both the first treatment solution and the second treatment solution may be provided through the same tubing or piping. In further embodiments where the components of the treatment solution are provided to the wellbore in a sequential manner, the first treatment solution and the second treatment solution may be provided separately through the first tubing and the second tubing.

The concentration of the sulfamic acid, the nitrite salt, or both, may affect the rate of heat and nitrogen gas generation as well as the concentration of the resulting acidic bisulfate salt. In one or more embodiments, the sulfamic acid is reacted with the nitrite salt at a sulfamic acid concentration of 1 to 2 molar (M). Further, in one or more embodiments, the sulfamic acid is reacted with the nitrite salt at a nitrite salt concentration of 1 to 2 molar.

The concentration of the acidic bisulfate salt at the walls of the wellbore and the surfaces of the production piping may affect the rate of stimulation and scale removal respectively. A greater concentration of the acidic bisulfate salt provides more reactive ions for reaction with the minerals of the formation at the wellbore wall or the scale on production piping. In one or more embodiments, the generated acidic bisulfate salt comprises a concentration of 1 to 2 molar at the walls of the wellbore to stimulate the walls of the wellbore. Similarly, in one or more embodiments, the generated acidic bisulfate salt comprises a concentration of 1 to 2 molar at the downhole surfaces of the production piping that are susceptible to scaling.

It will be appreciated that Reaction 1 of a nitrite salt and sulfamic acid provides an advantage over previous methods of generating acid downhole for stimulation of the wellbore and formation as reaction begins immediately upon mixture of the reactants. Specifically, previous methods of generating acid downhole utilizing an ammonium containing compound and a nitrite containing compound are dependent on elevation of the temperature, decreasing the pH, or both, to initiate the desired reaction. As such, the present method provides an advantage of not requiring heating of the reactants or the addition of acid as a reactant to initiate Reaction 1.

EXAMPLES

Testing was completed to verify the progression of Reaction 1 and generation of an acidic bisulfate salt, heat, and nitrogen gas.

Experimental Test 1

In an initial test, sodium nitrite (nitrite salt) and sulfamic acid were combined in a benchtop scale reaction to verify production of heat and gas. Specifically, 10 milliliters (ml) of 2 molar sulfamic acid and 10 ml of 2 molar sodium nitrite were combined in a test tube. An immediate reaction was noted with production of gas indicated by generation of visible bubbles within the test tube. Generation of heat was also measured with a thermometer indicating an increase in temperature from an initial 18.7° C. to 89.2° C.

Effectiveness against scale build-up expected to be encountered in the wellbore was also demonstrated. A scale sample representing a carbonate scale (calcium carbonate) was added to the reaction product from the combination of sodium nitrite and sulfamic acid in the test tube. A reaction between the scale sample and the reaction product was visually noted with depletion of the scale sample in combination with a bubbling reaction on the surface of the scale sample.

Experimental Test 2

In a second test, sodium nitrite (nitrite salt) and sulfamic acid were combined in a closed reactor to verify production of gas and observe the pressure behavior of the reaction. Initially, 400 milliliters (ml) of sodium nitrite was placed in a 1000 ml reaction chamber capable of being sealing. To the sodium nitrite, 400 ml of sulfamic acid was added at a rate of approximately 10 milliliters per minute (ml/min) over a timespan of approximately 36 minutes (min). With reference to FIG. 1, the increasing pressure within the closed reactor, provided in pounds per square inch (PSI), is noted as the reaction between the sodium nitrite and sulfamic acid progresses. The reaction time indicated in FIG. 1 represents the time elapsed since initiation of the introduction of the sulfamic acid to the sodium nitrite. The pressure continually increased within the reaction chamber during introduction of the sulfamic acid and peaked upon termination of the sulfamic acid introduction. The increasing pressure is indicative of the release of the nitrogen gas as Reaction 1 progresses.

Experimental Test 3

Figure 2:
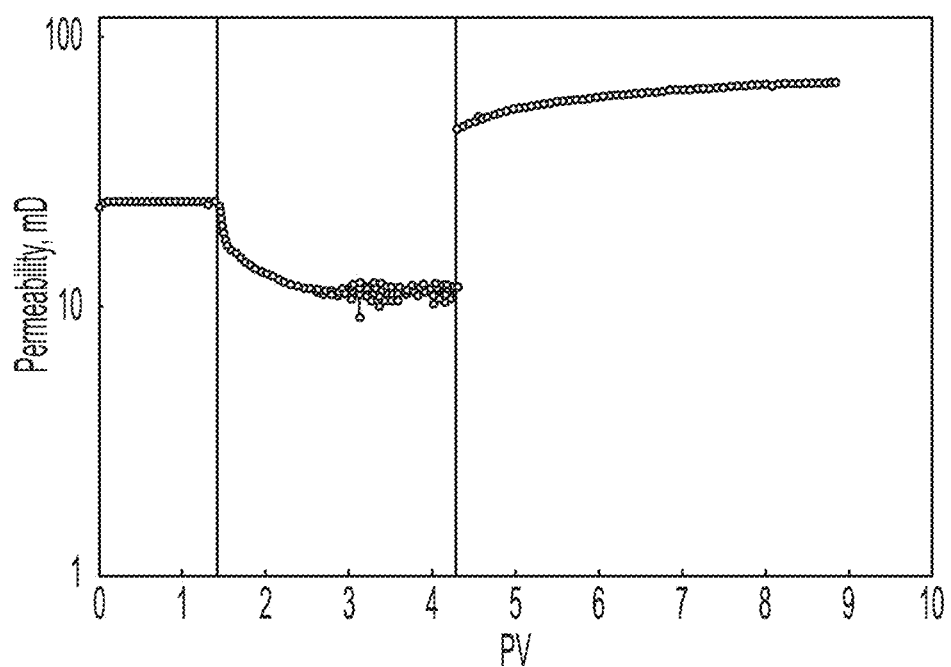
FIG. 2 is a graph of permeability of a carbonate plug sample treated with sodium bisulfate in accordance with embodiments of the present disclosure.

In a third test, sodium bisulfate (the acidic bisulfate salt generated from the reaction of sodium nitrite and sulfamic acid) was utilized as the stimulation agent in a core flooding test. Initially, brine comprising 2 weight percent (wt. %) KCl was injected at 2 ml/min into a carbonate plug sample to establish a base permeability of the carbonate plug sample. Subsequently, 2 molar sodium bisulfate was injected into the carbonate plug sample at 2 ml/min followed by injection of the 2 wt. % KCl brine again at 2 ml/min to determine the final permeability. The permeability was determined based on differential pressure measured during the test and then subsequent application of Darcy's Law to calculate the permeability. The resulting permeability for each step, provided in millidarcy (mD) is illustrated in FIG. 2 and Table 1.

It is noted that when transitioning from one fluid to another, the viscosity of the fluids plays a major role in permeability. As such, measurement of permeability requires multiple pore volumes (PV) of fluid to be passed through the sample before the permeability measurement stabilizes. The permeability stabilized once the second injected fluid completely flushes the first injected fluid. It will be appreciated that the pore volume is the volume of pores within the test sample, and is approximately 20% of the bulk volume for a carbonate plug sample prior to treatment. It is may be noted in FIG. 2 that the measured permeability indicates a downward slope as the sodium bisulfate flushes the KCl and conversely an upward slope as the KCl flushes the sodium bisulfate from the sample. This trend is present as the demonstrated permeability decreases as the viscosity of the fluid being injected increases.

TABLE 1

| Permeability of Carbonate Plug Sample | |
|---|---|
| | Permeability, millidarcy (mD) |
| Start of initial KCl injection | 24 mD |
| End of initial KCl injection | 24 mD |
| Start of second KCl injection | 45 mD |
| End of second KCl injection | 68 mD |

Figure 3A:
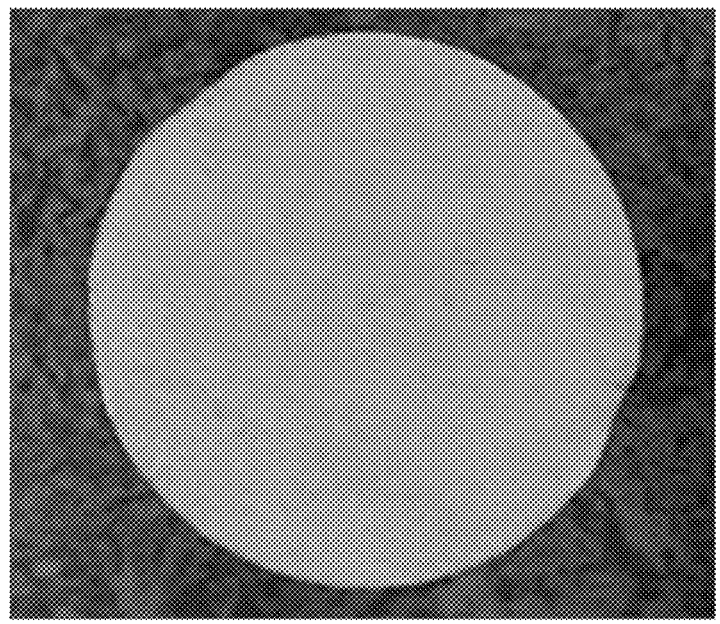
FIG. 3A a photograph of the carbonate plug sample of FIG. 2 prior to injection of sodium bisulfate.
Figure 3B:
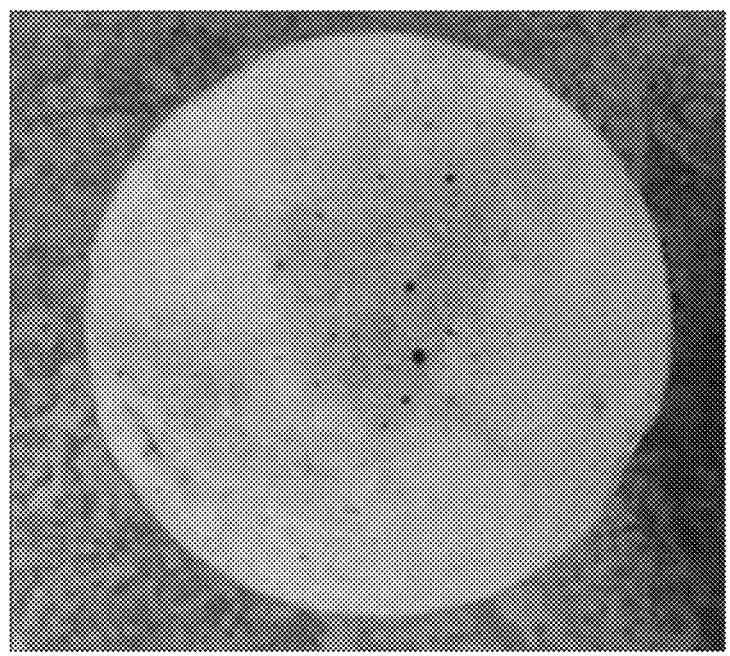
FIG. 3B a photograph of the carbonate plug sample of FIG. 2 subsequent to injection of sodium bisulfate.

The measurement of the permeability before and after stimulation of the carbonate plug sample with the sodium bisulfate demonstrated a 65% increase. For purposes of this disclosure, percentage increase in permeability is calculated as initial permeability subtracted from final permeability, divided by the final permeability, and multiplied by 100. The increase in permeability may also be visually noted in FIGS. 3A and 3B. Specifically, FIG. 3A illustrates the carbonate plug sample prior to stimulation with the sodium bisulfate and FIG. 3B illustrates the presence of distinct wormholes within the carbonate plug sample subsequent to stimulation with the sodium bisulfate.

It should now be understood the various aspects of the method and associated cleaning fluid for removing wellbore deposits are described and such aspects may be utilized in conjunction with various other aspects.

In a first aspect, the disclosure provides a method for removing wellbore deposits, the method comprising the steps of: providing a first treatment solution comprising nitrite salt into a wellbore, providing a second treatment solution comprising sulfamic acid into the wellbore, and allowing the first treatment solution and the second treatment solution to mix and form a cleaning fluid. The method further includes maintaining the first treatment solution and the second treatment solution in reactive connection to initiate reaction of the sulfamic acid and the nitrite salt to generate an acidic bisulfate salt, heat, and nitrogen gas, remove organic and inorganic deposits from the wellbore, and stimulate the walls of the wellbore by dissolving minerals in the walls of the wellbore with the generated acidic bisulfate salt. The organic and inorganic deposits are removed from the wellbore by liquefying the organic deposits within the wellbore upon elevation of the temperature of the organic deposits with the generated heat and breaking down the inorganic deposits with the generated acidic bisulfate salt.

In a second aspect, the disclosure provides the method of the first aspect, in which the method further comprises flowback of the well with the generated nitrogen gas to flushing the wellbore of the removed organic, inorganic deposits, and minerals.

In a third aspect, the disclosure provides the method of the first or second aspects, in which the nitrite salt comprises sodium nitrite resulting in the generated acidic bisulfate salt comprising sodium bisulfate.

In a fourth aspect, the disclosure provides the method of any of the first through third aspects, in which the organic deposits comprise at least one of wax and asphaltene.

In a fifth aspect, the disclosure provides the method of any of the first through fourth aspects, in which the inorganic deposits comprise scale formed from one or more carbonates.

In a sixth aspect, the disclosure provides the method of any of the first through fifth aspects, in which the walls of the wellbore are stimulated to a depth of 1 to 3 feet.

In a seventh aspect, the disclosure provides the method of any of the first through sixth aspects, in which the organic deposits are raised to a temperature of at least 66° C.

In an eighth aspect, the disclosure provides the method of any of the first through sixth aspects, in which the organic deposits are raised to a temperature of at least 100° C.

In a ninth aspect, the disclosure provides the method of any of the first through eighth aspects, in which maintaining the first treatment solution and the second treatment solution in reactive connection generates a temperature of 120 to 300° C. within the wellbore.

In a tenth aspect, the disclosure provides the method of any of the first through ninth aspects, in which the walls of the wellbore exhibit at least a 40% increase in permeability.

In an eleventh aspect, the disclosure provides the method of any of the first through tenth aspects, in which the first treatment solution and the second treatment solution are provided into the wellbore separately.

In a twelfth aspect, the disclosure provides the method of any of the first through eleventh aspects, in which the first treatment solution or the second treatment solution is provided within the wellbore through a first tubing and the other of the first treatment solution or the second treatment solution is provided within the wellbore through a second tubing.

In a thirteenth aspect, the disclosure provides the method of the twelfth aspect, in which the first tubing or the second tubing is an annulus of a production string.

In a fourteenth aspect, the disclosure provides the method of any of the first through thirteenth aspects, in which the sulfamic acid is reacted with the nitrite salt at a sulfamic acid concentration of 1 to 2 molar.

In a fifteenth aspect, the disclosure provides the method of any of the first through fourteenth aspects, in which where the sulfamic acid is reacted with the nitrite salt at a nitrite salt concentration of 1 to 2 molar.

In a sixteenth aspect, the disclosure provides the method of any of the first through fifteenth aspects, in which the generated acidic bisulfate salt comprises a concentration of 1 to 2 molar at the walls of the wellbore to stimulate the walls of the wellbore.

In a seventeenth aspect, the disclosure provides the method of any of the first through sixteenth aspects, in which stimulating the walls of the wellbore with the generated acidic bisulfate salt comprises dissolving one or both of calcite ($CaCO_3$) and dolomite ($CaMg(CO_3)_2$) from the walls of the wellbore.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that that the mere use of the term "first" and "second" does not require that there be any "third" component, although that possibility is contemplated under the scope of the present disclosure.

As used in this disclosure and in the appended claims, the words "comprise," "has," and "include" and all grammatical variations thereof are each intended to have an open, non-limiting meaning that does not exclude additional elements or steps.

What is claimed is:

1. A method for removing wellbore deposits, the method comprising the steps of:
   providing a first treatment solution comprising a nitrite salt into a wellbore;
   providing a second treatment solution comprising sulfamic acid into the wellbore;
   allowing the first treatment solution and the second treatment solution to mix and form a cleaning fluid; and
   maintaining the first treatment solution and the second treatment solution in reactive connection to:
   initiate reaction of the sulfamic acid and the nitrite salt to generate an acidic bisulfate salt, heat, and nitrogen gas;
   remove organic and inorganic deposits from the wellbore by:
   liquefying the organic deposits within the wellbore upon elevation of the temperature of the organic deposits with the generated heat, and
   breaking down the inorganic deposits with the generated acidic bisulfate salt; and
   stimulate the walls of the wellbore by dissolving minerals in the walls of the wellbore with the generated acidic bisulfate salt,
   where the generated acidic bisulfate salt comprises a concentration of 1 to 2 molar at the walls of the wellbore to stimulate the walls of the wellbore.

2. The method of claim 1, where the method further comprises flowback of the well with the generated nitrogen gas to flushing the wellbore of the removed organic, inorganic deposits, and minerals.

3. The method of claim 1, where the nitrite salt comprises sodium nitrite resulting in the generated acidic bisulfate salt comprising sodium bisulfate.

4. The method of claim 1, where the organic deposits comprise at least one of wax and asphaltene.

5. The method of claim 1, where the inorganic deposits comprise scale formed from one or more carbonates.

6. The method of claim 1, where the walls of the wellbore are stimulated to a depth of 1 to 3 feet.

7. The method of claim 1, where the organic deposits are raised to a temperature of at least 66° C.

8. The method of claim 1, where the organic deposits are raised to a temperature of at least 100° C.

9. The method of claim 1, where maintaining the first treatment solution and the second treatment solution in reactive connection generates a temperature of 120 to 300° C. within the wellbore.

10. The method of claim 1, where the walls of the wellbore exhibit at least a 40% increase in permeability.

11. The method of claim 1, where the first treatment solution and the second treatment solution are provided into the wellbore separately.

12. The method of claim 11, where the first treatment solution or the second treatment solution is provided within the wellbore through a first tubing and the other of the first treatment solution or the second treatment solution is provided within the wellbore through a second tubing.

13. The method of claim 12, where the first tubing or the second tubing is an annulus of a production string.

14. The method of claim 1, where the sulfamic acid is reacted with the nitrite salt at a sulfamic acid concentration of 1 to 2 molar.

15. The method of claim 1, where the sulfamic acid is reacted with the nitrite salt at a nitrite salt concentration of 1 to 2 molar.

16. The method of claim 1, where stimulating the walls of the wellbore with the generated acidic bisulfate salt comprises dissolving one or both of calcite ($CaCO_3$) and dolomite ($CaMg(CO_3)_2$) from the walls of the wellbore.

* * * * *

UNITED STATES PATENT AND TRADEMARK OFFICE
CERTIFICATE OF CORRECTION

PATENT NO. : 10,718,184 B1
APPLICATION NO. : 16/570167
DATED : July 21, 2020
INVENTOR(S) : Abdullah M. Alharith Page 1 of 1

It is certified that error appears in the above-identified patent and that said Letters Patent is hereby corrected as shown below:

On the Title Page

Column 2, Lines 13 and 14 item (56), Other Publications, cite No. 5, delete "H11126, published Jan.5, 1983" and insert --H1126, published Jan. 5, 1993--, therefor.

In the Specification

In Column 3, Line(s) 60, delete " $HOSO_2NH_2 + XNO_2 \rightarrow XHSO_4 + H_2O + N_2$ (gas) + $\Delta H$ (heat) Reaction 1 " and insert --$HOSO_2NH_2 + XNO_2 \rightarrow XHSO_4 + H_2O + N_2$ (gas) + $\Delta H$ (heat) Reaction 1--, therefor.

In Column 4, Line(s) 62, delete "$CaCO_3 + 2NaHSO_4 \rightarrow Ca^{+2} + H_2O + CO_2 + 2Na^+ + 2SO_4^{2}$" and insert --$CaCO_3 + 2NaHSO_4 \rightarrow Ca^{+2} + H_2O + CO_2 + 2Na^+ + 2SO_4^{-2}$--, therefor.

Signed and Sealed this
First Day of December, 2020

Andrei Iancu
*Director of the United States Patent and Trademark Office*